(12) United States Patent
Pasca et al.

(10) Patent No.: US 11,294,626 B2
(45) Date of Patent: Apr. 5, 2022

(54) FLOATING-POINT DYNAMIC RANGE EXPANSION

(71) Applicant: Intel Corporation, Santa Clara, CA (US)

(72) Inventors: Bogdan Mihai Pasca, Toulouse (FR); Martin Langhammer, High Wycombe (GB)

(73) Assignee: Intel Corporation, Santa Clara, CA (US)

( * ) Notice: Subject to any disclaimer, the term of this patent is extended or adjusted under 35 U.S.C. 154(b) by 676 days.

(21) Appl. No.: 16/145,149

(22) Filed: Sep. 27, 2018

(65) Prior Publication Data
US 2019/0042193 A1    Feb. 7, 2019

(51) Int. Cl.
*G06F 7/487*      (2006.01)
*G06F 7/544*      (2006.01)

(52) U.S. Cl.
CPC .......... *G06F 7/4876* (2013.01); *G06F 7/5443* (2013.01)

(58) Field of Classification Search
CPC ............................. G06F 7/4876; G06F 7/5443
See application file for complete search history.

(56) References Cited

U.S. PATENT DOCUMENTS

| 5,459,681 | A | * | 10/1995 | Harrison | G06F 5/01 |
| | | | | | 708/201 |
| 6,978,287 | B1 | * | 12/2005 | Langhammer | G06F 9/3824 |
| | | | | | 708/230 |
| 9,053,045 | B1 | * | 6/2015 | Langhammer | G06F 7/544 |
| 2004/0181567 | A1 | * | 9/2004 | Pappalardo | G06F 7/4876 |
| | | | | | 708/620 |
| 2006/0101243 | A1 | * | 5/2006 | Siu | G06F 7/483 |
| | | | | | 712/221 |
| 2016/0092167 | A1 | * | 3/2016 | Rarick | G06F 7/483 |
| | | | | | 708/497 |

* cited by examiner

*Primary Examiner* — Michael D. Yaary
(74) *Attorney, Agent, or Firm* — Fletcher Yoder, P.C.

(57) ABSTRACT

The present disclosure relates generally to techniques for adjusting the number representation (e.g., format) of a variable before and/or after performing one or more arithmetic operations on the variable. In particular, the present disclosure relates to scaling the range of a variable to a suitable representation based on available hardware (e.g., hard logic) in an integrated circuit device. For example, an input in a first number format (e.g., bfloat16) may be scaled to a second number format (e.g., half-precision floating-point) so that circuitry implemented to receive inputs in the second number format may perform one or more arithmetic operations on the input. Further, the output produced by the circuitry may be scaled back to the first number format. Accordingly, arithmetic operations, such as a dot-product, performed in a first format may be emulated by scaling the inputs to and/or the outputs from arithmetic operations performed in another format.

20 Claims, 9 Drawing Sheets

US 11,294,626 B2

FLOATING-POINT DYNAMIC RANGE EXPANSION

BACKGROUND

The present disclosure relates generally to integrated circuits, such as field-programmable gate arrays (FPGAs). More particularly, the present disclosure relates to techniques to adjust (e.g., scale) a variable before and after processing such that operations performed on the variable in a first number format may be emulated by operations performed in another number format using circuitry elements of an integrated circuit (e.g., programmable logic of an FPGA).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Integrated circuits may represent variables according to a number of different formats. For example, a variable may be represented in single-precision floating-point format, half-precision floating-point format, bfloat16 format, and/or the like. Each format (e.g., number representation) may provide different advantages in terms of memory use, the precision of representable values, the range of representable values, and/or the like. In some embodiments, the application, such as the operations and/or processing, of the variable in the integrated circuit may dictate a suitable format for the variable. For instance, in machine learning applications, the increased range of formats such as bfloat16 may be beneficial when compared to the range of half-precision floating-point format. However, in some embodiments, the number formats available to be represented in the integrated circuit may be limited by available hardware resources.

BRIEF DESCRIPTION OF THE DRAWINGS

Various Aspects of this Disclosure May be Better Understood Upon Reading the Following Detailed Description and Upon Reference to the Drawings in which.

DETAILED DESCRIPTION OF SPECIFIC EMBODIMENTS

Figure 1:
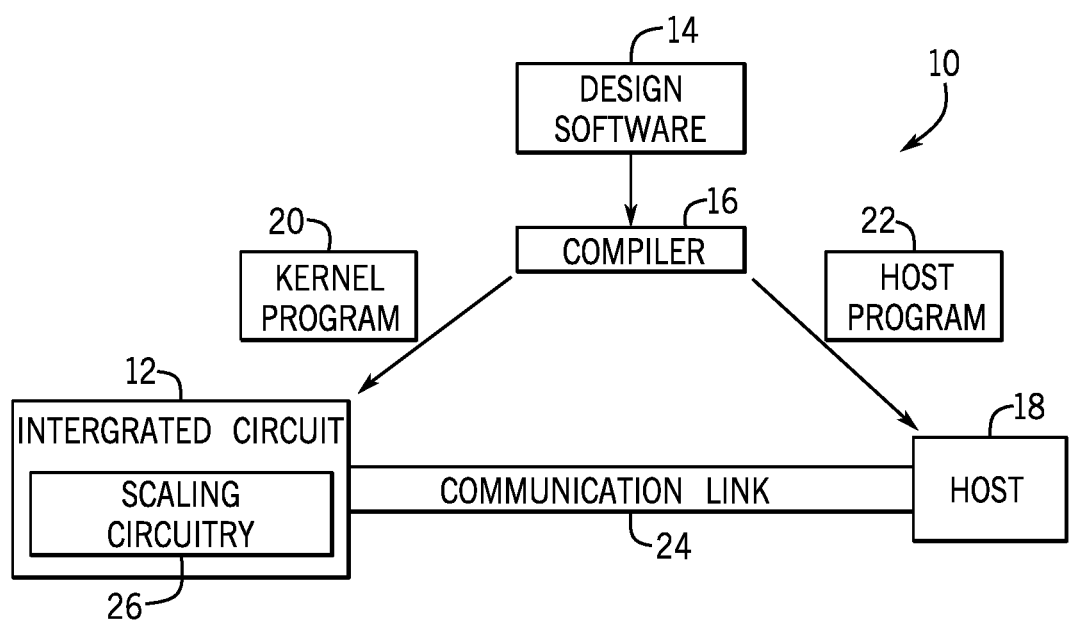
FIG. 1 is a block diagram of a system for implementing scaling circuitry, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in further detail below, embodiments of the present disclosure relate generally to adjusting the number representation (e.g., format) of a variable before and/or after performing one or more arithmetic operations on the variable. More specifically, the present disclosure relates to scaling a variable to a suitable representation based on available hardware (e.g., hard logic) in an integrated circuit. For example, an input in a first number format (e.g., bfloat16) may be scaled to a second number format (e.g., half-precision floating-point) so that a digital signal processing (DSP) circuit implemented to receive inputs in the second number format may perform one or more arithmetic operations on the input. Further, in some embodiments, the output produced by the DSP circuit in a second or third number format (e.g., single-precision floating-point) may be scaled back to the first number format. Accordingly, arithmetic operations, such as a dot-product, performed in a first format may be emulated by scaling the inputs to and/or the outputs from arithmetic operations performed in a second format.

Accordingly, an integrated circuit may include pre-scaling circuitry communicatively coupled to an input of a DSP circuitry and/or post-scaling circuitry communicatively coupled to an output of the DSP circuitry. As will be discussed in further detail below, the DSP circuitry may be implemented to perform a multiplication operation, such as a dot-product, on a set of inputs having the second number format. As such, the pre-scaling circuitry may be implemented to scale a set of inputs from a first number format to a second number format. To do so, the pre-scaling circuitry may determine the maximum sum of the exponents of pairs of inputs that may be multiplied in the DSP circuitry. That is, for example, the pre-scaling circuitry may determine the maximum exponent value that would result from multiplying two inputs together. To avoid overflow at the DSP circuitry, the pre-scaling circuitry may then, based at least in part on the maximum exponent value, scale the exponent of each of the set of inputs to a suitable range according to the second number format. Accordingly, the inputs may be scaled to the second format and routed to the DSP circuitry. After the DSP circuitry performs one or more arithmetic operations on the scaled inputs, post-scaling circuitry may scale the output of the DSP circuitry back to the first format. More specifically, based at least in part on the maximum exponent value determined by the pre-scaling circuitry, as well as the first format, the exponent of the output may be scaled to a range corresponding to the first format. Thus, while the arithmetic operations were performed in a different format, the scaled output emulates the result of performing the arithmetic operations in the first number format.

With the foregoing in mind, FIG. 1 illustrates a block diagram of a system 10 that may implement arithmetic operations. A designer may desire to implement functionality, such as the scaling operations of this disclosure, on an integrated circuit device 12 (such as a field-programmable gate array (FPGA) or an application-specific integrated circuit (ASIC)). In some cases, the designer may specify a high-level program to be implemented, such as an OpenCL program, which may enable the designer to more efficiently and easily provide programming instructions to configure a set of programmable logic cells for the integrated circuit device 12 without specific knowledge of low-level hardware description languages (e.g., Verilog or VHDL). For example, because OpenCL is quite similar to other high-level programming languages, such as C++, designers of programmable logic familiar with such programming languages may have a reduced learning curve than designers that are required to learn unfamiliar low-level hardware description languages to implement new functionalities in the integrated circuit device 12.

The designers may implement their high-level designs using design software 14, such as a version of Intel® Quartus® by INTEL CORPORATION. The design software 14 may use a compiler 16 to convert the high-level program into a lower-level description. The compiler 16 may provide machine-readable instructions representative of the high-level program to a host 18 and the integrated circuit device 12. The host 18 may receive a host program 22 which may be implemented by the kernel programs 20. To implement the host program 22, the host 18 may communicate instructions from the host program 22 to the integrated circuit device 12 via a communications link 24, which may be, for example, direct memory access (DMA) communications or peripheral component interconnect express (PCIe) communications. In some embodiments, the kernel programs 20 and the host 18 may enable configuration of scaling circuitry 26 (e.g., combinatorial circuitry) on the integrated circuit device 12. The scaling circuitry 26 may include circuitry and/or other logic elements and may be configured to, for example, scale a variable from a first number representation to a second number representation.

While the techniques described herein relate to the application of a high-level program, in some embodiments, the designer may use the design software 14 to generate and/or to specify a low-level program, such as the low-level hardware description languages described above. Further, in some embodiments, the system 10 may be implemented without a separate host program 22. Moreover, in some embodiments, the techniques described herein may be implemented in circuitry as a non-programmable circuit design. Thus, embodiments described herein are intended to be illustrative and not limiting.

Figure 2:
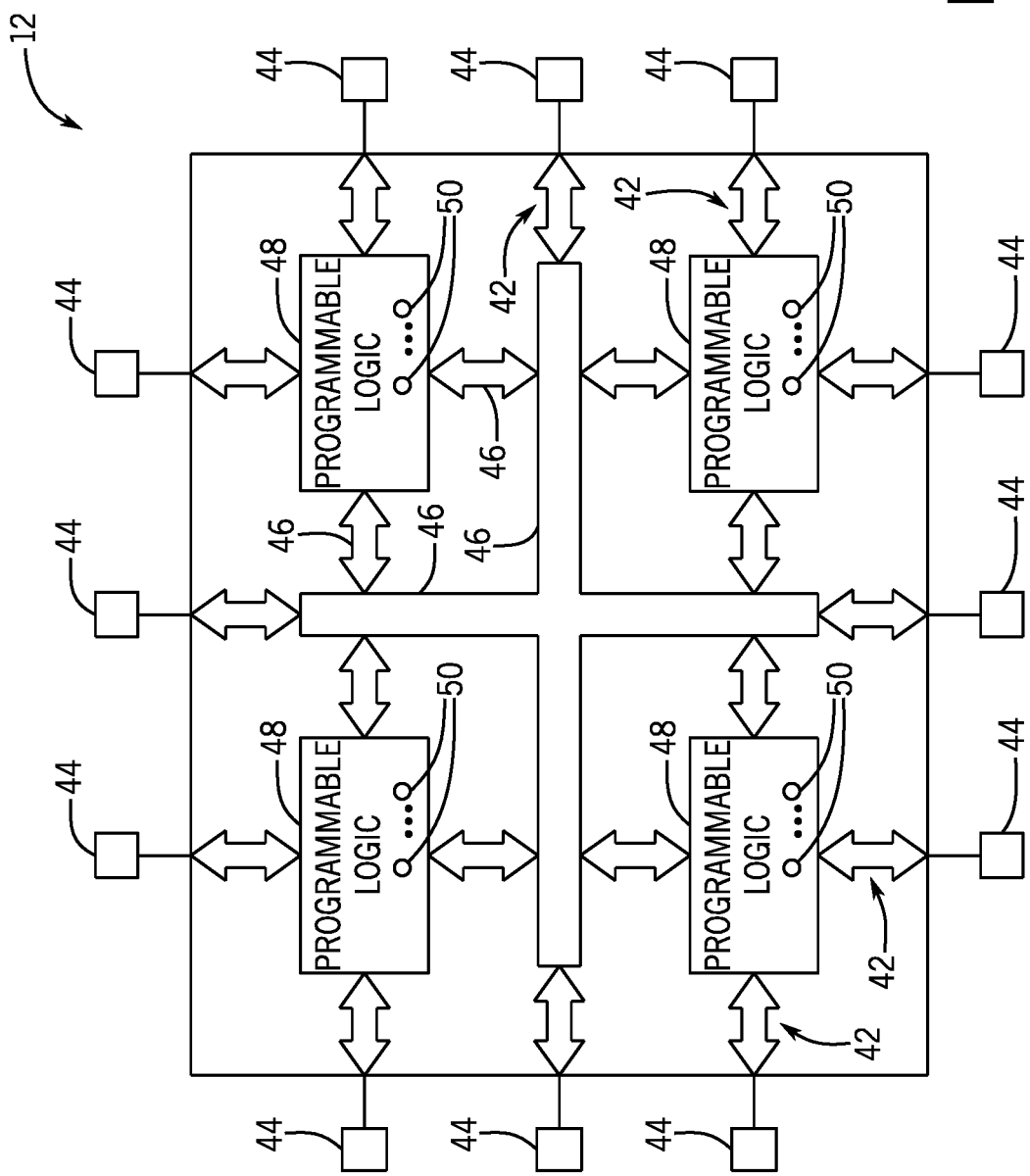
FIG. 2 is a block diagram of an integrated circuit where scaling circuitry may be implemented, in accordance with an embodiment.

Turning now to a more detailed discussion of the integrated circuit device 12, FIG. 2 illustrates an example of the integrated circuit device 12 as a programmable logic device, such as a field-programmable gate array (FPGA). Further, it should be understood that the integrated circuit device 12 may be any other suitable type of programmable logic device (e.g., an application-specific integrated circuit and/or application-specific standard product). As shown, integrated circuit device 12 may have input/output circuitry 42 for driving signals off device and for receiving signals from other devices via input/output pins 44. Interconnection resources 46, such as global and local vertical and horizontal conductive lines and buses, may be used to route signals on integrated circuit device 12. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of programmable logic 48.

Programmable logic devices, such as integrated circuit device 12, may contain programmable elements 50 with the programmable logic 48. For example, as discussed above, a designer (e.g., a customer) may program (e.g., configure) the programmable logic 48 to perform one or more desired functions. By way of example, some programmable logic devices may be programmed by configuring their programmable elements 50 using mask programming arrangements, which is performed during semiconductor manufacturing. Other programmable logic devices are configured after semiconductor fabrication operations have been completed, such as by using electrical programming or laser programming to program their programmable elements 50. In general, programmable elements 50 may be based on any suitable programmable technology, such as fuses, antifuses, electrically-programmable read-only-memory technology, random-access memory cells, mask-programmed elements, and so forth.

Many programmable logic devices are electrically programmed. With electrical programming arrangements, the programmable elements 50 may be formed from one or more memory cells. For example, during programming, configuration data is loaded into the memory cells using pins 44 and input/output circuitry 42. In one embodiment, the memory cells may be implemented as random-access-memory (RAM) cells. The use of memory cells based on RAM technology is described herein is intended to be only one example. Further, because these RAM cells are loaded with configuration data during programming, they are sometimes referred to as configuration RAM cells (CRAM). These memory cells may each provide a corresponding static control output signal that controls the state of an associated logic component in programmable logic 48. For instance, in some embodiments, the output signals may be applied to the gates of metal-oxide-semiconductor (MOS) transistors within the programmable logic 48.

Figure 3:
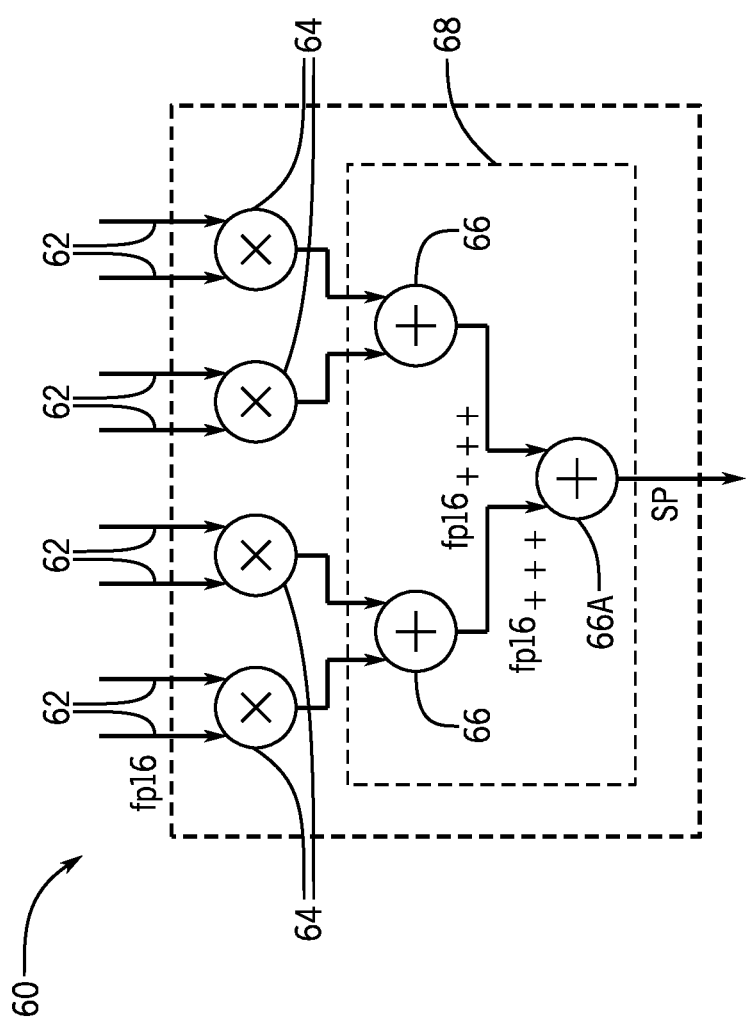
FIG. 3 is a block diagram of digital signal processing (DSP) circuitry, in accordance with an embodiment.

Turning now to FIG. 3, in some embodiments, the integrated circuit device 12 may include digital signal processing (DSP) circuitry 60, such as multiply-accumulate (MAC) circuitry, a DSP block, arithmetic circuitry, or a DSP slice (e.g., a portion of a DSP block), implemented to perform one or more arithmetic operations (e.g., a dot-product) on an input. Moreover, in some embodiments, the DSP circuitry 60 may include hardened logic (e.g., hardened MAC circuitry, a hardened DSP block, hardened arithmetic circuitry, a hardened DSP slice, and/or the like) to perform the one or more arithmetic operations. The one or more arithmetic operations may produce a result having a particular number representation (e.g., format and/or range). Further, in some embodiments the number representation of the result may not match the number representation of the original input. For example, in the illustrated embodiment, the DSP circuitry 60 includes input circuitry 62 implemented to receive a number of half-precision floating-point (e.g., FP16) inputs. Accordingly, each of the inputs includes sixteen bits, where one bit represents a sign bit of a number, five bits represent an exponent of the number, and ten bits represent a mantissa (e.g., fraction) of the number. Further, after determining the dot-product of the inputs, the DSP circuitry 60 outputs a single-precision floating-point (e.g., SP) result, which includes a single sign bit, an 8-bit exponent field, and a 23-bit mantissa field (e.g., thirty-two total bits). The illustrated format of the inputs and outputs, however, is not meant to be limiting. Indeed, the inputs and outputs may take any suitable format.

To perform the one or more arithmetic operations on a set of inputs (e.g., to determine a dot-product of the set of inputs), the DSP circuitry 60 may include a number of multipliers 64. While the input circuitry 62 may receive inputs having a first number representation (e.g., half-precision floating-point format), the multipliers 64 may output a set of multiplication results in a second, internal number format of the DSP circuitry 60, denoted in FIG. 3 as FP16+++. For example, to account for potential overflow, the multiplication results may be formatted with a 1-bit sign field, an 8-bit exponent field, and a 10-bit mantissa field. In other embodiments, the multiplication results may remain in the half-precision floating-point format or may be formatted according to another suitable number format (e.g., single-precision floating-point and/or the like), which may depend on the format of the set of inputs to the DSP circuitry 60.

DSP circuitry 60 may further include a suitable number of adders 66 (e.g., floating-point adders) and/or a suitable number of stages of an adder tree 68 to sum the multiplication results. The adders 66 may be implemented to sum the multiplication results according to an internal number format of the DSP circuitry 60, which may be the same or a different format compared to the format of the multiplication results. Further, in some embodiments, a final sum of each of the multiplication results may be determined by, for example, a single-precision adder 66A in the final adder stage of the adder tree 68. Accordingly, the single-precision adder 66A may output a 32-bit result having a 1-bit sign field, an 8-bit exponent field, and a 23-bit mantissa field. To that end, the 10-bit fraction fields of the inputs to the single-precision adder 66A may be extended to 23-bits before they are summed. In other embodiments, the final sum may be determined by an adder 66 implemented to produce a result in another number format (e.g., half-precision floating point, FP16+++, an extended precision and/or the like), which may depend on the format of the set of inputs to the DSP circuitry 60, the format used to initially sum the multiplication results, and/or the like.

However, in some embodiments, inputs for the arithmetic operations performed by the DSP circuitry 60 may not be formatted according to the number format expected at the input circuitry 62 (e.g., half-precision floating-point). For example, in some embodiments, the input circuitry 62 may receive inputs having a 1-bit sign field, an 8-bit exponent field, and a 7-bit fraction field (e.g., bfloat16). Accordingly, in some embodiments, before receiving an input at the input circuitry 62, the input may be scaled from one format to another. Moreover, in some embodiments, it may be desirable to produce an output whose format does not correspond to (e.g., match) the single-precision floating point format resulting from the single-precision adder 66A. For instance, continuing with the above example, it may be desirable to scale the output back to bfloat16 in cases where the DSP circuitry 60 receives an input in the bfloat16 format. As such, the output of the DSP circuitry 60 may be scaled from one format to another.

While the illustrated DSP circuitry 60 is implemented to determine a dot-product, the DSP circuitry 60 may be implemented to perform any suitable multiply-accumulate function and/or other arithmetic operations. Moreover, the format of the input to, the output from, and any intermediate values of the DSP circuitry 60 may be any suitable number format. Accordingly, bfloat16 inputs may be scaled to half-precision floating-point, extended precision inputs may be scaled to single-precision floating-point, among other combinations. Thus, embodiments described herein are intended to be illustrative and not limiting.

Figure 4:
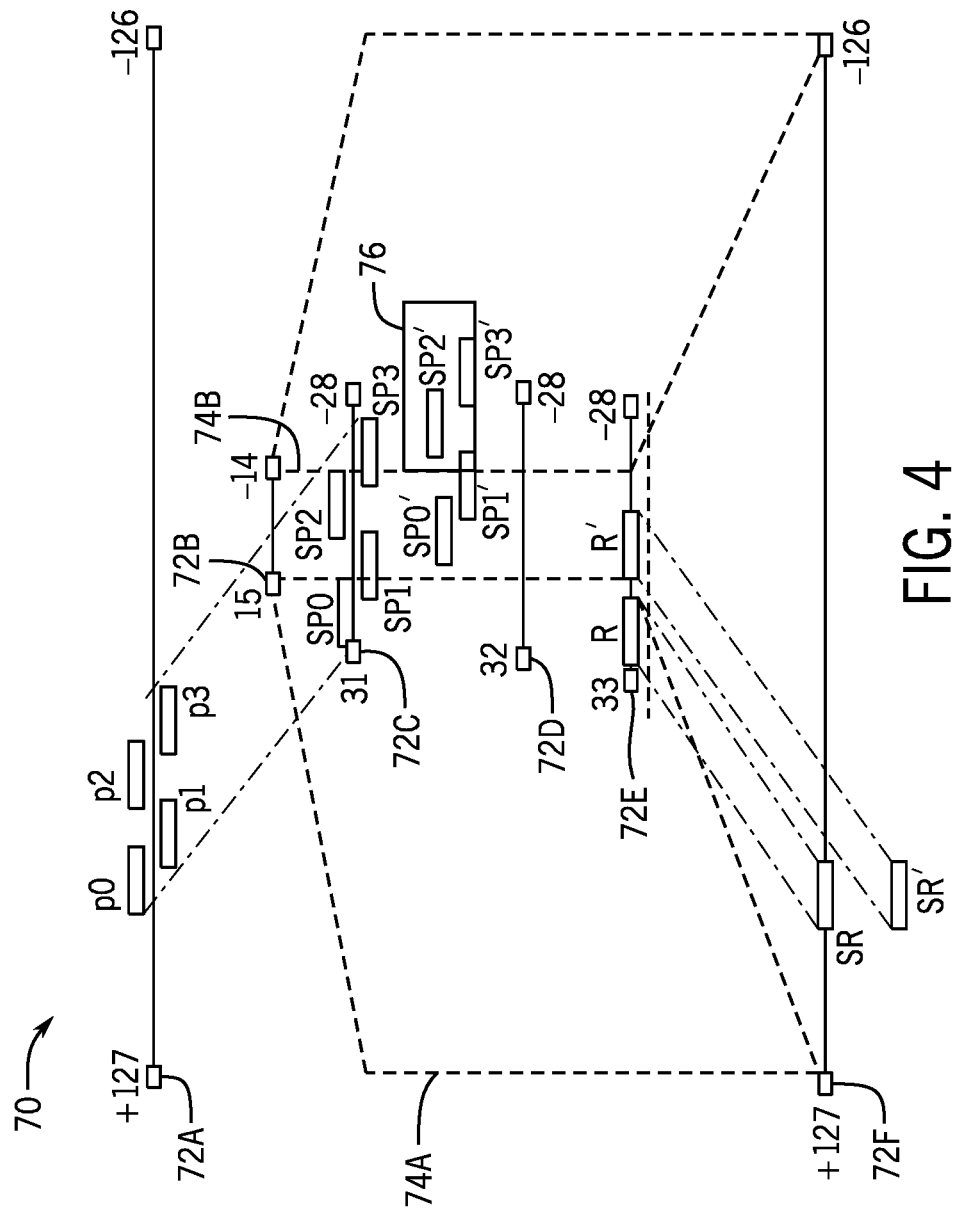
FIG. 4 is a range diagram of a set of variables input to the DSP circuitry, in accordance with an embodiment.

To better illustrate the scaling of an input to and/or an output from the DSP circuitry 60, FIG. 4 depicts a range diagram 70 for an example set of variables (e.g., P0, P1, P2, and P3) input to the DSP circuitry 60. The range diagram 70 illustrates changes to the unbiased range (e.g., exponent range) of the set of variables, which may result from scaling and/or arithmetic operations. For example, a first range 72A may represent the range of each of the set of variables input to the DSP circuitry 60. Accordingly, the first range 72A may extend from '−126' to '127' for a set of variables each formatted according to bfloat16. More specifically, as described in greater detail below, because pairs of corresponding inputs may be multiplied at the multipliers 64 of the DSP circuitry 60, each of the illustrated set of variables may represent the range of a respective product of a pair of variables. Accordingly, the set of variables may represent the sums of respective pairs of exponents.

The second range 72B may represent the range the input circuitry 62 is implemented to receive, such as half-precision floating-point. Accordingly, in some embodiments, the second range 72B may extend from '−14' to '15.' Further, a third range 72C may represent the range of the products output by the multipliers 64. As such, because the exponents of a pair of inputs to a multiplier 64 may be summed during a multiplication operation, the third range 72C may be double the second range 72A and may include an additional bit to account for normalization. Thus, in some embodiments, the third range 72B may extend from '−28' to '31.' Further, because the DSP circuitry 60 includes two stages of adders 66 in the adder tree 68, the range diagram 70 includes two adder ranges (e.g., a fourth range 72D and a fifth range 72E), which each extend the maximum of the previous range (e.g., the third range 72C and the fourth range 72D, respectively) by a bit to account for overflow from the addition operation. Further, the range diagram 70 includes a first internal range 74A, which may correspond to the range of a first embodiment of an internal number format of the DSP circuitry 60, such as FP16+++. The range diagram 70 also includes a second internal range 74B, which may represent the range of a second embodiment of an internal number format of the DSP circuitry 60, such as half-precision floating-point.

As discussed in greater detail below, in some embodiments, the scaling of the set of variables input to the input circuitry 62 may depend in part on the internal range (e.g., 74A or 74B) of the DSP circuitry 60. For example, to maximize the amount of data retained (e.g., the accuracy) in the set of variables at the input circuitry 62 and to prevent and/or reduce internal overflow within the DSP circuitry 60, the set of variables may be scaled based in part on the second range 72B and the internal range (e.g., 74A or 74B). For instance, in embodiments where the internal range corresponds to the first internal range 74A (e.g., FP16+++range), the maximum product (e.g., P0) represented by the set of variables may be scaled (e.g., pre-scaled) prior to being input to the input circuitry 62 such that the unbiased exponent of the corresponding scaled product (e.g., SP0) is '30'. Accordingly, in some embodiments, the pair of exponents corresponding to the maximum product (P0) may each be scaled to an unbiased value of '15,' which may maximize the use of the second range 72B to represent each of the exponents in the set of variables. Moreover, the remaining exponents of the variables in the set of variables (e.g., P1, P2, and P3) may be scaled according to the same technique and/or offset to produce the remaining scaled products (e.g., SP1, SP2, and SP3, respectively). Further, because the internal range corresponds to the first internal range 74A, the subsequent arithmetic operations (e.g., addition) performed on the set of scaled products in the DSP circuitry 60 may not cause overflow (e.g., loss of data). Accordingly, the result (R) produced by the DSP circuitry 60 may be scaled to produce a scaled result (SR) within a sixth range 72F, which may be the same as the first range 72A, without losing data included in the set of variables.

However, in embodiments where the internal range corresponds to the second internal range 74B (e.g., half-precision floating-point range), for example, the maximum product (e.g., P0) represented by the set of variables may be scaled (e.g., pre-scaled) prior to being input to the input circuitry 62 such that the unbiased exponent of the corresponding scaled product (e.g., SP0') is less than '15'. More specifically, the maximum product (e.g., P0) may be scaled, as described in greater detail below, such that after the two stages of addition implemented by the adder tree 68, the exponent of the final sum (R') does not exceed the maximum value of the second internal range 74B (e.g., 15). Moreover, the remaining variables in the set of variables (e.g., P1, P2, and P3) may be scaled according to the same technique and/or offset to produce the remaining scaled products (e.g., SP1', SP2', and SP3', respectively). However, as illustrated by the area 76 of the range diagram 70, exponents of products smaller than the maximum product may be scaled to a range beyond the second internal range 74B, which may result in loss of data (e.g., underflow) before any addition is calculated at the adder tree 68. Accordingly, the additional result (R') produced by the DSP circuitry 60 may be less accurate than the result (R) produced in an embodiment with the first internal range 74A. As such, scaling the additional result (R') to produce an additional scaled result (SR') may produce a less accurate final result than the scaled result (SR). Further, it may be appreciated that the scaling technique and/or offsets described above as being applied in the embodiments having the second internal range 74B may be applied to the embodiments having the first internal range 74A. For example, the set of variables may be scaled to a value less than '30' in an embodiment where the internal range is the first internal range 74. However, such embodiments may produce less accurate scaled results than the scaling technique and/or offsets described above with reference to the embodiments having the first internal range 74A.

Moreover, while the illustrated embodiment depicts certain ranges (e.g., 72A, 72B, 72C, 72D, 72E, and 72F) and certain internal ranges (e.g., 74A and 74B), which may respectively correspond to certain number formats, it may be appreciated that any suitable ranges may be applied within the DSP circuitry 60. Further, any suitable range may be scaled to the corresponding range of the input circuitry 62, and the output of the DSP circuitry 60 may be scaled to any suitable range.

Figure 5:
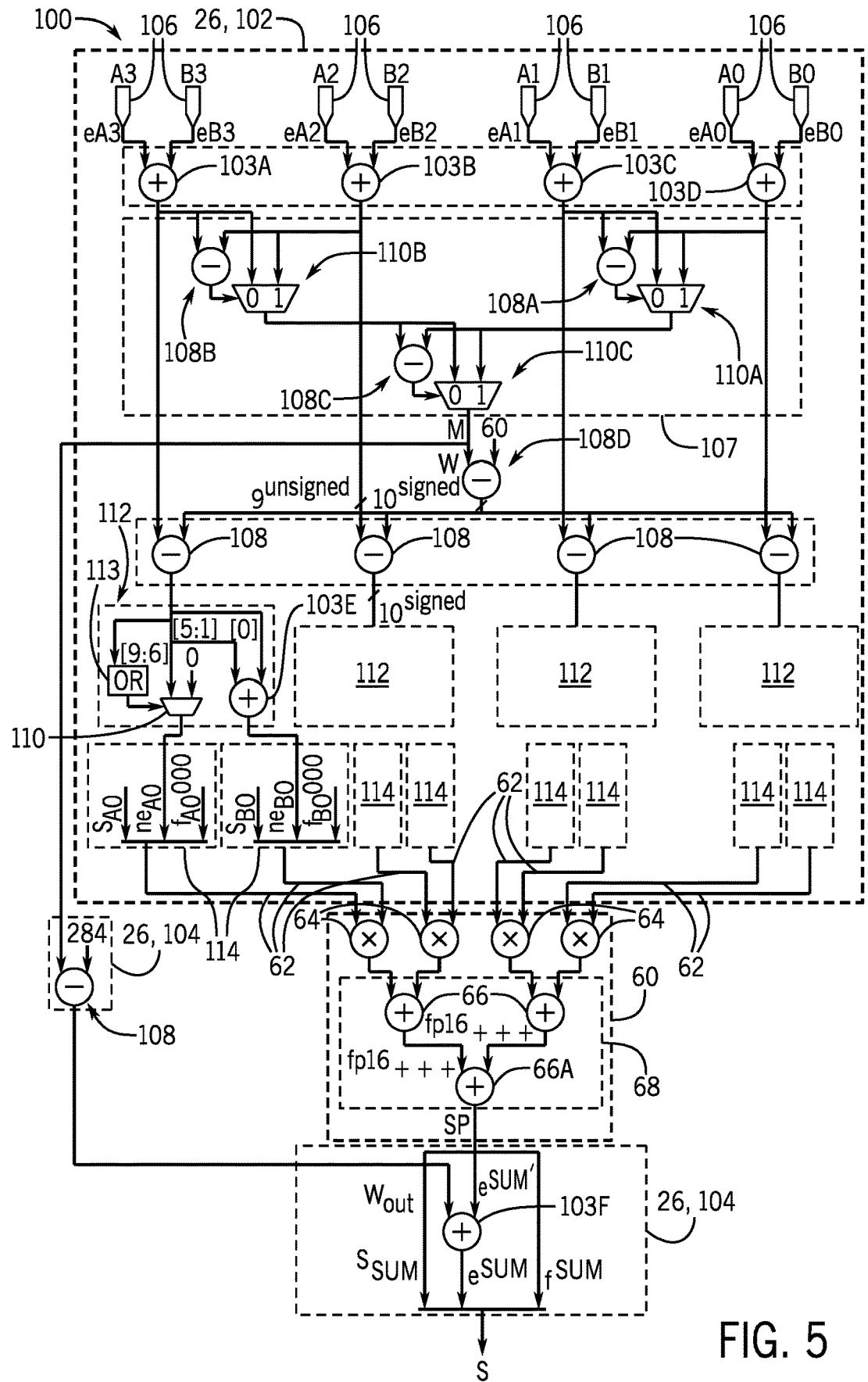
FIG. 5 is a block diagram of arithmetic operation emulation circuitry, which includes scaling circuitry communicatively coupled to the DSP circuitry of FIG. 3, in accordance with an embodiment.

FIG. 5 illustrates an embodiment of arithmetic operation emulation circuitry 100, which may include scaling circuitry 26 operatively coupled to the DSP circuitry 60. The scaling circuitry 26 may include pre-scaling circuitry 102 implemented to adjust the format of a set of inputs (e.g., A0, A1, A2, A3, B0, B1, B2, and B3) and may include post-scaling circuitry 104 implemented to adjust the format of an output produced by the DSP circuitry 60. More specifically, the pre-scaling circuitry 102 may adjust the range of an input to the DSP circuitry 60 by, for example, scaling the exponent of the input from a first number of bits to a second number of bits. Further, the post-scaling circuitry 104 may adjust the range of the output of the DSP circuitry 60 by, for example, scaling the exponent of the output to the first number of bits (e.g., the original number of bits of the input).

As illustrated, in some embodiments, the pre-scaling circuitry 102 may include input circuitry 106 that receives a set of inputs each having a first number format (e.g., bfloat16). To that end, because the illustrated input circuitry 62 is implemented to receive inputs in half-precision floating-point format, the pre-scaling circuitry 102 may scale the exponents (e.g., eA0, eA1, eA2, eA3, eB0, eB1, eB2, eB3, and eB4) of each of the set of inputs (e.g., A0, A1, A2, A3, B0, B1, B2, and B3, respectively). More specifically, the pre-scaling circuitry 102 may scale the exponent of an input of the set of inputs from eight bits to five bits to avoid overflow during the arithmetic operations implemented by the DSP circuitry 60. For example, the DSP circuitry 60 includes a multiplication operation (e.g., performed by the multipliers 64), which effectively sums the respective exponents of a pair of multiplied inputs (e.g., A0 and AB, A1 and B1, A2 and B2, and A3 and B3). Accordingly, to reduce and/or prevent overflow, each of the sums of the respective exponents of a pair of multiplied inputs may be scaled so as not to exceed the maximum range representable in the number format expected at the input circuitry 62 (e.g., half-precision floating-point format). Thus, the input circuitry 106 may route the pairs of exponents corresponding to the inputs multiplied at the DSP circuitry 60 (e.g., A0 and B0, A1 and B21, A2 and B2, and A3 and B3) to be summed at a respective adder 103 (e.g., 103A, 103B, 103C, 103D), which may be implemented to sum integer values.

The pre-scaling circuitry 102 may then determine a maximum value (e.g., M) of the pairwise sums of the exponents using, for example, comparison circuitry 107. In some embodiments, for example, the pre-scaling circuitry 102 may include a set of subtractors 108 and/or comparators implemented to determine differences between pairs of the computed sums of the exponents. Accordingly, as illustrated, a first subtractor 108A may subtract the sums resulting from the least significant inputs (e.g., subtract the sum of the exponents of A0 and B0 from the sum of the exponents of A1 and B1), and a second subtractor 108B may subtract the sums resulting from the most significant inputs (e.g., subtract the sum of the exponents of A2 and B2 from the sum of the exponents of A3 and B3). Further, an output of the first subtractor 108A may route into a first multiplexer 110A (mux), which may select between the sum of the exponents of the first set of inputs (e.g., A0 and B0) or the sum of the exponents of the second set of inputs (e.g., A1 and B1) based on the output. As such, the first mux 110A may select the maximum sum between the two sums using the difference provided by the first subtractor 108A. Similarly, a second mux 110B may select between the sum of the exponents of the third set of inputs (e.g., A2 and B2) and the sum of the exponents of the fourth set of inputs (e.g., A3 and B3) using the difference between the two sums provided by the second subtractor 108B. Accordingly, to determine the maximum sum between the sums selected by the first mux 110A and the second mux 110B, the pre-scaling circuitry 102 may include a third subtractor 108C operatively coupled to a third mux 110C. The third subtractor 108C may determine the difference between the respective sums output by the first mux 110A and the second mux 110B. The third mux 110C may then use the difference as a select signal to select between the respective sums output by the first mux 110A and the second mux 110B. To that end, the third mux 110C may select the maximum value (M) of the sums of the corresponding pairs of exponents.

Using the maximum value (M), the pre-scaling circuitry 102 may determine an offset value (W). Accordingly, in some embodiments, the pre-scaling circuitry 102 may include an additional subtractor 108C, which may receive the maximum value (M) and an integer (e.g., '60') as inputs. In some embodiments, the integer routed into the subtractor 108C may be dependent on the number format expected by the input circuitry 62 (e.g., half-precision floating-point format) of the DSP circuitry 60 and/or the internal number format of the DSP circuitry 60 (e.g., FP16+++), as described above with reference to FIG. 4.

For example, in the illustrated embodiment, the input circuitry 62 is implemented to receive half-precision floating-point format numbers, and the multipliers 64 are implemented to output products according to the FP16+++format. In half-precision floating-point format, the maximum biased exponent value is '30' (e.g., '15' summed with a bias value of '15'), so the maximum value of the sum of two biased exponents is '60' (e.g., (15+15)+(15+15)). In bfloat16, however, the maximum biased exponent value is '254' (e.g., '127' summed with a bias value of '127'), and the maximum biased value of the sum of two exponents is '508' (e.g., (127+127)+(127+127)). Accordingly, to adjust the exponent values of inputs in bfloat16 and/or another format different from half-precision floating point, the maximum sum (M) of two biased exponents may be scaled down by an integer to '60' (e.g., the maximum biased sum of two exponents in half-precision floating-point). In the illustrated embodiment, in cases where the mantissa of a product output by a multiplier 64 is greater than or equal to '2', the product may have an exponent maximum biased value greater than the maximum sum (M) (e.g., '60'). For example, the biased exponent of the product may be '61', which overflows from the range of half-precision floating-point. However, because the internal number format of the illustrated DSP circuitry 60 is FP16+++, which has an increased range compared to half-precision floating-point, overflow may be reduced and/or eliminated.

On the other hand, in some embodiments, such as when the internal number format matches the number format of the input circuitry 62, the integer may be determined according to an alternative technique. For example, in at least the case that the number format of the input circuitry 62 and the internal number format are half-precision floating-point, the integer may be determined based in part on the number of adder stages included in the adder tree 68. As an illustrative example, the integer may be determined based on the equation:

Integer=bias*3−1−adderStages, where the term bias represents the bias corresponding to the range of the internal number format, and the term adderStages represents the number of adder stages in the adder tree 68. Because each adder stage may increase the exponent by a single bit, subtracting the number of adder stages may reduce and/or eliminate overflow of the range of the exponent. Accordingly, for the bias value of 15, which corresponds to the bias of half-precision floating-point, and the illustrated adder tree 68, which includes two adder stages, the value '42' (e.g., 15*3−1−2) may be selected to provide opportunity for an exponent (e.g., of a variable input to and/or determined by the DSP circuitry 60) value to grow (e.g., up to '45'). Further, while the integer is described above as being determined based in part on the range of half-precision floating-point and/or based on both the range of half-precision floating-point and FP16+++, any suitable integer may be employed for another number format or combination of number formats such that range overflow is mitigated in subsequent calculations. Thus, embodiments are intended to be illustrative and not limiting.

To determine the suitable offset value (W), the additional subtractor 108D may subtract the integer from the maximum value of the sums (M). Accordingly, with the offset value (W) generated by the additional subtractor 108C, the pre-scaling circuitry 102 may scale down each of the sums of exponents to a suitable range, according to the number format (e.g., half-precision floating-point format) input to the DSP circuitry 60 and/or the internal number format of the DSP circuitry 60. More specifically, the pre-scaling circuitry 102 may subtract the offset value (W) from each of the sums of exponents such that the maximum sum (M) of the exponents is scaled down to a suitable range, which may reduce and/or eliminate range overflow in the DSP circuitry 60, as discussed above. For example, with the illustrated case of scaling sums to half-precision floating-point exponents (e.g., 5-bit exponents), the sums of exponents may be scaled to a maximum value of '60'.

Starting from the scaled sums of the exponents, the pre-scaling circuitry 102 may then compute a new respective exponent for each input (e.g., A3, A2, A1, A0, B3, B2, B1, and B0) using exponent adjustment circuitry 112. More specifically, in some embodiments, the pre-scaling circuitry 102 may split each of the scaled sums of the exponents from a 10-bit value into two, 5-bit values, as illustrated. To determine a new respective exponent for an input, the pre-scaling circuitry 102 may determine whether a scaled sum of a particular pair of exponents is even or odd. If the scaled sum is even, the pre-scaling circuitry may output the new exponents of each of the pair of inputs (e.g., A0 and B0) by right-shifting the scaled sum (e.g., dividing the scaled sum by two). Accordingly, in the case of the sum of exponents corresponding to the maximum value (M), which was subsequently scaled to '60' (e.g., an even number), the pre-scaling circuitry 102 may produce '30' as the new exponent of each of the pair of corresponding inputs. If, on the other hand, the scaled sum is odd, one of the exponents of the pair may be determined by right-shifting the scaled sum and the other exponent may be determined by adding '1' to the right-shifted scaled sum. Further, if the scaled exponent is negative, which, in some cases, indicates that at least one of the original inputs was '0', the pre-scaling circuitry 102 may force one of the new exponents of the pair of inputs to '0'. Moreover, because the new exponents are balanced, the half-precision input exponent range is maximized.

Accordingly, for a first input (e.g., A0) of a pair of inputs, the pre-scaling circuitry 102 may include a mux 110, which may output the value of the scaled exponent sum divided by two (e.g., the bits [5:1] right-shifted by a bit) or '0' depending on a select signal provided by an OR gate 113 (e.g., logical OR gate). The OR gate 113 may receive one or more of the most significant bits (MSBs) of the scaled exponent sum (e.g., [9:6]) and may determine the logical OR of the bits. Accordingly, the output of the OR gate 113 may represent whether the scaled exponent sum is negative. Thus, as described above, the mux 110 may output '0' or the scaled exponent sum divided by two based on whether the scaled exponent sum is negative.

Further, for a second input (e.g., B0) of the pair of inputs, the pre-scaling circuitry 102 may route the first bit (e.g., [0]) of the scaled exponent sum to a first input of an adder 103E (e.g., an integer adder) and may route the following four bits (e.g., [5:1]) to a second input of the adder 103E. If the scaled exponent sum is even, the first bit will have a value of '0'. Accordingly, the adder 103E will output the four bits ([5:1]) that have been right-shifted by a bit from their original bit position. Thus, as described above, the adder 103E will output the value of the scaled exponent sum divided by two as a new exponent for the second input (e.g., B0) of the pair of inputs. If, however, the scaled exponent sum is odd, the first bit will have a value of '1'. Accordingly, the adder 103E will sum the first bit with the four bits [5:1], which have been right-shifted by a bit from their original bit position. Thus, as described above, the adder 103E will output '1' added to the value of the scaled exponent sum divided by two as a new exponent for the second input (e.g., B0) of the pair of inputs.

As described herein, the exponents of inputs are scaled by the pre-scaling circuitry 102. Additionally, in some embodiments, the pre-scaling circuitry 102 may adjust the fraction of an input. In some embodiments, for example, the fraction of the input may differ in size compared to the fraction format expected at the input circuitry 62. Accordingly, the pre-scaling circuitry 102 and/or additional circuitry and/or logic may zero pad the fraction with a suitable number of bits or truncate a suitable number of bits from the fraction before the scaled input is received at the input circuitry 62. Moreover, for each of the inputs, the respective fraction of the input may be routed to be concurrently available with the respective new exponent of the input at the input circuitry 62, as illustrated by the routing 114 (e.g., wiring and/or electrical connection).

As discussed above with reference to FIG. 3, the DSP circuitry 60 may then receive each of the scaled inputs at input circuitry 62 and may perform a number of arithmetic operations on the inputs. More specifically, the DSP circuitry 60 may perform dot-product operations on each of the inputs and may output a single-precision floating-point format result. As such, the post-scaling circuitry 104 may include circuitry and/or logic suitable to scale the result from single-precision floating-point format to another format, such as the original format of the inputs received at the input circuitry 106 (e.g., bfloat16). More specifically, the post-scaling circuitry 104 may include circuitry and/or logic suitable to scale the range of the result back to the original range of inputs received at the input circuitry 106 (e.g., bfloat16). Accordingly, the post-scaling circuitry 104 may route the exponent of the result (eSUM') to a first input of an adder 103F. Further, the post-scaling circuitry 104 may route a result offset value (Wout) to a second input of the adder 66. To determine the result offset value (Wout) the post-scaling circuitry 104 may route the maximum sum value (M) to a subtractor 108. The subtractor may subtract an integer (e.g., '284') from the maximum sum value (M) to generate the result offset value (Wout). As the goal of the result offset value (Wout) is to scale the exponent of the result back to the original range of the inputs received at the input circuitry 106, the integer may be selected based in part on the bias of the original input format, the integer input to the subtractor 108D (e.g., the integer used to scale down the exponents of the inputs to the input circuitry 106), the bias of the format of the inputs received at the input circuitry 62, and/or a suitable combination thereof. For example, for the illustrated embodiment, twice the bias of the original input format (e.g., 2*127=254) may be summed with twice the bias of the format of the inputs received at the input circuitry 62 (e.g., 2*15=30) subtracted from the integer input to the subtractor 108D (e.g., 60) to produce an integer value of '284' (e.g., (2*127)+(60−(2*15))=284). Further, in embodiments with a different integer value applied at the subtractor 108D, which may depend on one or more number formats implemented in the DSP circuitry 60, the integer value applied at the subtractor 108 of the post-scaling circuitry 104 may be adjusted appropriately. For example, in the example described above where the integer applied at the subtractor 108D is '42', the integer value of '266' (e.g., (2*127)+(42−(2*15))=266) may be routed to the subtractor 108 of the post-scaling circuitry 104.

While not shown, the post-scaling circuitry 104 may additionally include circuitry and/or logic to handle the cases when the exponent of the result (eSUM') is '0' and/or when the exponent (eSUM) of the scaled sum (S) is negative or greater than or equal to a maximum exponent value allowed by the output format. If the exponent of the result (eSUM') is '0', the result offset value (Wout) may be flushed to '0' to keep the value of the exponent (eSUM) of the scaled sum (S) '0'. Accordingly, the post-scaling circuitry 104 may include, for example, a logic gate and/or a multiplexer 110 implemented to determine whether the exponent of the result (eSUM') is '0' and to select between the result offset value (Wout) and '0' based on the determination. If the biased exponent of the scaled sum (eSUM) is negative, circuitry, such as a multiplexer 110 may forward '0' onto the exponent of the scaled sum (eSUM). Further, the post-scaling circuitry 104 may include circuitry and/or logic to handle the case when the exponent of the scaled sum (eSUM) equals or exceeds the maximum exponent value of the format (e.g., single-precision floating-point) of the output of the DSP circuitry 60. In the illustrated embodiment, for example, if the exponent of the scaled sum (eSUM) is greater than or equal to the maximum exponent value of single-precision floating-point (e.g., '255'), circuitry (not shown), such as a multiplexer 110, may forward the exponent of the scaled sum (eSUM) to be the exponent (eSUM) of the scaled sum and may flush the value of the fraction of the scaled sum (fSUM) to zero.

Further, while the illustrated scaling circuitry 26 is suitable to adjust the format of an input to the DSP circuitry 60 and the format of an output from the DSP circuitry, other embodiments may scale only the input or the output. Moreover, the pre-scaling circuitry may include any suitable circuitry and/or logic to determine the maximum value (M). For example, in addition to or in the alternative of the illustrated combination of subtractors 108 and multiplexers 110, the pre-scaling circuitry 102 may include different circuitry and/or logic, such as a comparator, implemented to determine the maximum value (M). Further, in some embodiments, the pre-scaling circuitry 102 may be implemented to convert an input from a number format other than bfloat16 and/or the post-scaling circuitry 104 may be implemented to convert an output to the number format other than bfloat16. Accordingly, the integers used to determine the offset value (W) and the result offset value (Wout) may be adjusted. In some embodiments, for example, each of the integers may be programmed based on number format of the inputs to the pre-scaling circuitry and the expected number format of the inputs received at the DSP circuitry 60. Accordingly, the integers may be stored in a programmable mode register and/or a suitable memory location and may be updated based on the implementation of the DSP circuitry 60 and/or the format of the inputs to the pre-scaling circuitry 102. In any case, the embodiments described herein are intended to be illustrative and not limiting.

Figure 6:
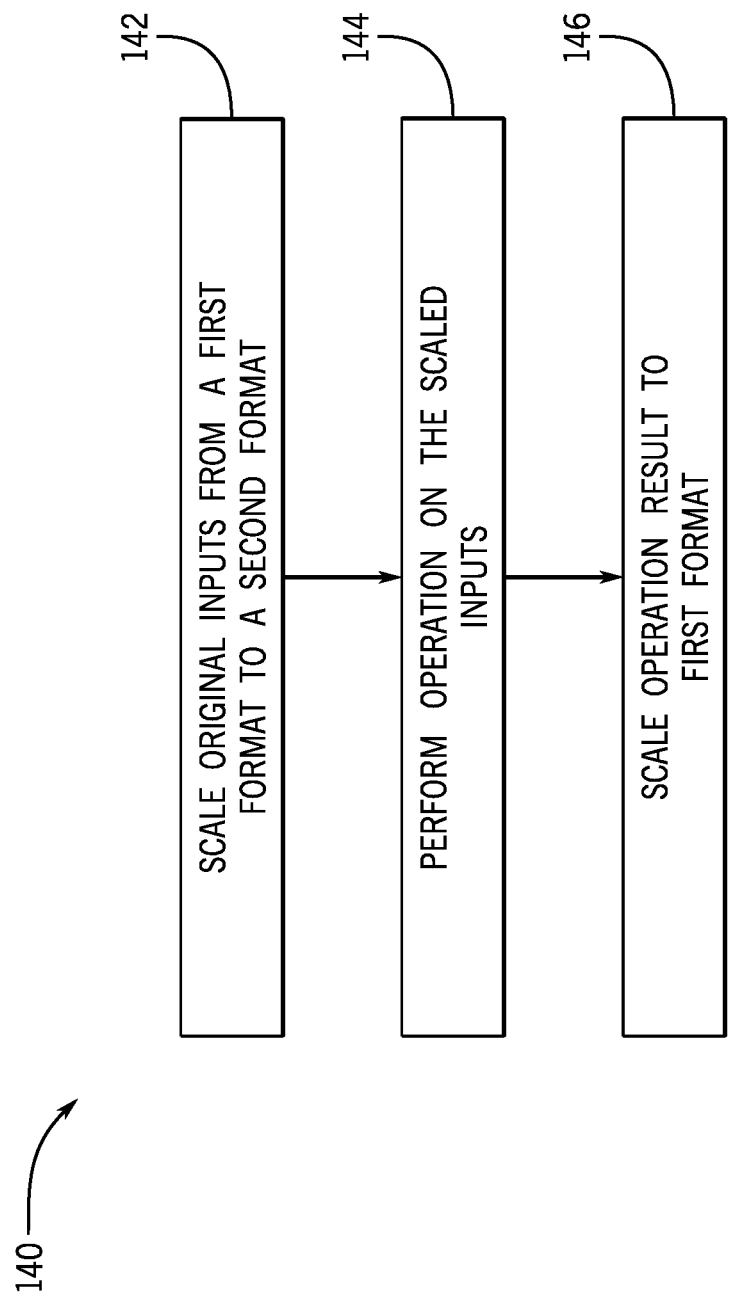
FIG. 6 is a flow chart of a process for adjusting the representation (e.g., format) of a number before and after processing, in accordance with an embodiment.

Turning now to FIG. 6, an example of a process 140 for adjusting the representation (e.g., format) of a number before and after processing is illustrated. Generally, the process 140 includes scaling a set of original inputs to the DSP circuitry 60 from a first format to a second format (process block 142), performing an operation on the scaled inputs (process block 144), and scaling a result produced by the DSP circuitry to the first format (process block 146).

Although the following description of the process 140 is described in a particular order, which represents a particular embodiment, it should be noted that the process 140 may be performed in any suitable order. Additionally, embodiments of the process 140 may omit process blocks and/or include suitable additional process blocks. While the process 140 is described as being implemented by the scaling circuitry 26 (e.g., the pre-scaling circuitry 102 and the post-scaling circuitry 104) and the DSP circuitry 60, a portion of the process 140 may be implemented by any suitable circuitry and/or logic. For example, in some embodiments, the process 140 may be implemented at least in part by executing instructions stored in a tangible, non-transitory, computer-readable medium, such as memory, using processing circuitry, such as one or more processors.

As illustrated, in some embodiments, the process 140 may begin by scaling set of inputs to the DSP circuitry 60 from a first format to a second format (process block 142). For example, an input having a bfloat16 floating-point format (e.g., a 1-bit sign field, an 8-bit exponent field, and a 7-bit fraction field) may be scaled to half-precision floating-point format. While the example input is described as being scaled from bfloat16 to half-precision, any suitable input format may be scaled to any suitable other format. For example, the input may be received as single-precision, double-precision, or a custom number format, among other formats, and may be scaled to half-precision, bfloat16, another custom number format, and/or the like.

Figure 7:
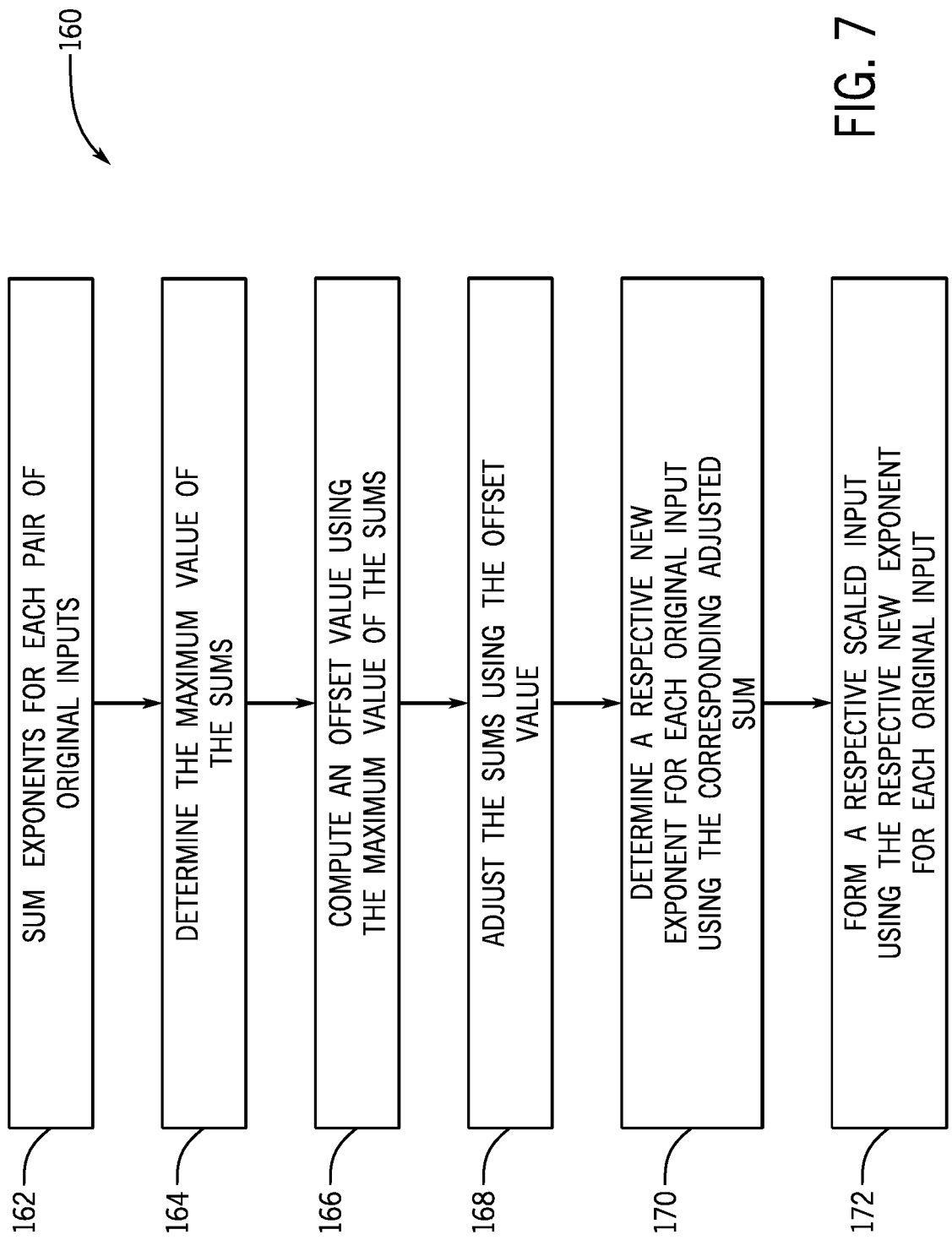
FIG. 7 is a flow chart of process to scale a set of inputs from a first format to a second format is illustrated, in accordance with an embodiment.

Turning now to FIG. 7, an example of a process 160 to scale the set of inputs from a first format to a second format is illustrated. Generally, the process 160 includes summing the exponents for each pair of corresponding original inputs (process block 162), determining a maximum value (M) of the sums (process block 164), computing an offset value (W) using the maximum value (M) of the sums (process block 166), adjusting the sums using the offset value (W) (process block 168), determining a respective new exponent for each original input using the respective adjusted sum (process block 170), and forming a respective scaled input in the second format for each original input using the respective new exponent (process block 172).

Although the following description of the process 160 is described in a particular order, which represents a particular embodiment, it should be noted that the process 160 may be performed in any suitable order. Additionally, embodiments of the process 160 may omit process blocks and/or include suitable additional process blocks. While the process 160 is described as being implemented by the pre-scaling circuitry 102, a portion of the process 160 may be implemented by any suitable circuitry and/or logic. For example, in some embodiments, the process 160 may be implemented at least in part by executing instructions stored in a tangible, non-transitory, computer-readable medium, such as memory, using processing circuitry, such as one or more processors.

As illustrated, in some embodiments, the process 160 may begin by summing the exponents of each pair of original inputs (process block 162). As described above, a set of adders 103 in, for example, the pre-scaling circuitry 102 may sum pairs of inputs corresponding to dot-product input pairs. For example, the set of adders 103 may sum the exponents of a first input (e.g., A0) and a second input (e.g., B0) that will be multiplied by one another at the DSP circuitry 60.

The illustrated process 160 then proceeds with determining a maximum value of the sums (M) of the exponents of each pair of inputs (process block 164). To determine the maximum value (M) among the sums of the exponents, the sums may be compared to one another. Accordingly, in some embodiments, a subtractor 108 may determine the difference between a pair of sums. The sign of the difference determined by the subtractor 108 may then be used to select the sum having a higher value at, for example, a mux 110. Further, any suitable number of subtractors 108 and multiplexers 110 may be used in series (e.g., sequentially) and/or in parallel to perform a suitable number of comparisons to determine the maximum value of the sums (M). Additionally or alternatively, the exponent sums may be compared by other suitable logic and/or circuitry to identify the maximum value of the sums (M).

The identified maximum value of the sums (M) may then be used to compute the offset value (W) (process block 166). The offset value (W) may be used to scale the sums of exponents based on the range of the number format (e.g., half-precision) expected by the input circuitry 62 of the DSP circuitry 60 and/or the internal number format of the DSP circuitry 60. Accordingly, in some embodiments, the offset value (W) may be computed by subtracting an integer value from the maximum value (M) using a subtractor 108D. The integer value may represent the sum of maximum biased exponent values of the range of the number format of the input circuitry 62. As such, to scale the inputs to a half-precision floating-point format, an integer value of '60' (e.g., 30+30) may be used. Additionally or alternatively, the integer value may be selected to reduce or eliminate range overflow during operations implemented in the DSP circuitry 60.

After computing the offset value (W), the sums of the exponents of the pairs of inputs may be adjusted (e.g., scaled) using the offset value (process block 168). More specifically, the offset value (W) may be subtracted from each of the sums of the exponents of the pairs of inputs. As a result, the sum of the exponents corresponding to the maximum value (M) of the sums may be reduced to a suitable range to mitigate range overflow in the DSP circuitry 60. For example, in the case the second format is half-precision, the sum of exponents corresponding to the maximum value (M) may be adjusted down to '60'.

Using a corresponding adjusted sum, a respective new exponent may then be determined for each original input (process block 170). For a first input and a second input, if an adjusted sum of the exponents of the first input and the second input is even, the new exponents of each of the first input and the second input may be determined by dividing the adjusted sum by two. Accordingly, the adjusted exponent of the first input may be equal to the adjusted exponent of the second input. If, on the other hand, the adjusted sum is odd, the adjusted exponent of the first input may be determined by taking the floor of the adjusted sum divided by two, and the adjusted exponent of the second input may be determined by taking the floor of the adjusted exponent divided by two and then adding '1'. Further, if the adjusted sum is negative (e.g., less than '0'), the first input may be forced to '0'.

After determining a new exponent for each of the original inputs, a set of scaled inputs may be formed using the respective new exponents (process block 172). More specifically, the respective remaining bits (e.g., sign bit and/or the mantissa) of each input may be coalesced with the corresponding new exponent to form a respective scaled input in the second number format. In some embodiments, if the precision (e.g., bit-width) of the mantissa does not match the precision of the second number format, the mantissa may be truncated or zero-padded, as appropriate. For example, scaling an input from bfloat16 to half-precision may involve zero-padding the mantissa from seven bits to ten bits. Further, by coalescing the remaining bits, such as the sign bit and the mantissa, with a respective new exponent, the format of each of the scaled inputs may be suitable to input to the DSP circuitry 60.

Returning now to FIG. 6, the illustrated embodiment of the process 140 then proceeds with performing an operation on the scaled inputs (process block 144). In some embodiments the operation involves a dot-product operation. For example, after coalescing the remaining bits of each input with the corresponding new input in the second number format, the input circuitry 62 may route the scaled inputs to the DSP circuitry 60, which may determine a dot-product using the scaled inputs.

The operation performed on the inputs may produce a result, which may be represented in the second number format or a third number format, such as single-precision. For example, in some embodiments, to reduce overflow resulting from the summation of multiple half-precision operands, one or more single-precision adders and/or single-precision combinatorial circuitry may be used to produce a single-precision result. Accordingly, the result of the operation may be scaled to the first format (e.g., the original format of the inputs) (process block 146). In some embodiments, scaling the result to the first format may involve scaling the range of the result back to the original range of the first format. Accordingly, scaling the result may involve determining a result offset (Wout) using the maximum value (M) of the sums of the exponents and an integer. For example, the result offset (Wout) may be determined by subtracting an integer from the maximum value (M) of the sums. The integer may be determined and/or programmed based on the format of the inputs (e.g., the first format), the format expected at the input circuitry 62 of the DSP circuitry 60 (e.g., the second format), the internal number format of the DSP circuitry 60, or a suitable combination thereof. Further, if the exponent is non-zero, the result offset (Wout) may be summed with the exponent of the result to scale the exponent. If the exponent is zero, the exponent may be summed with zero and/or may bypass a summation operation such that the exponent remains zero. Accordingly, while the operation is performed in another format, the format of the output from the DSP circuitry 60 may be adjusted by, for example, the post-scaling circuitry 104 to the format of the inputs. That is, for example, the number representation of the inputs may be adjusted before and after processing such that operations performed in the first format may be emulated by operations performed in another format.

Figure 8:
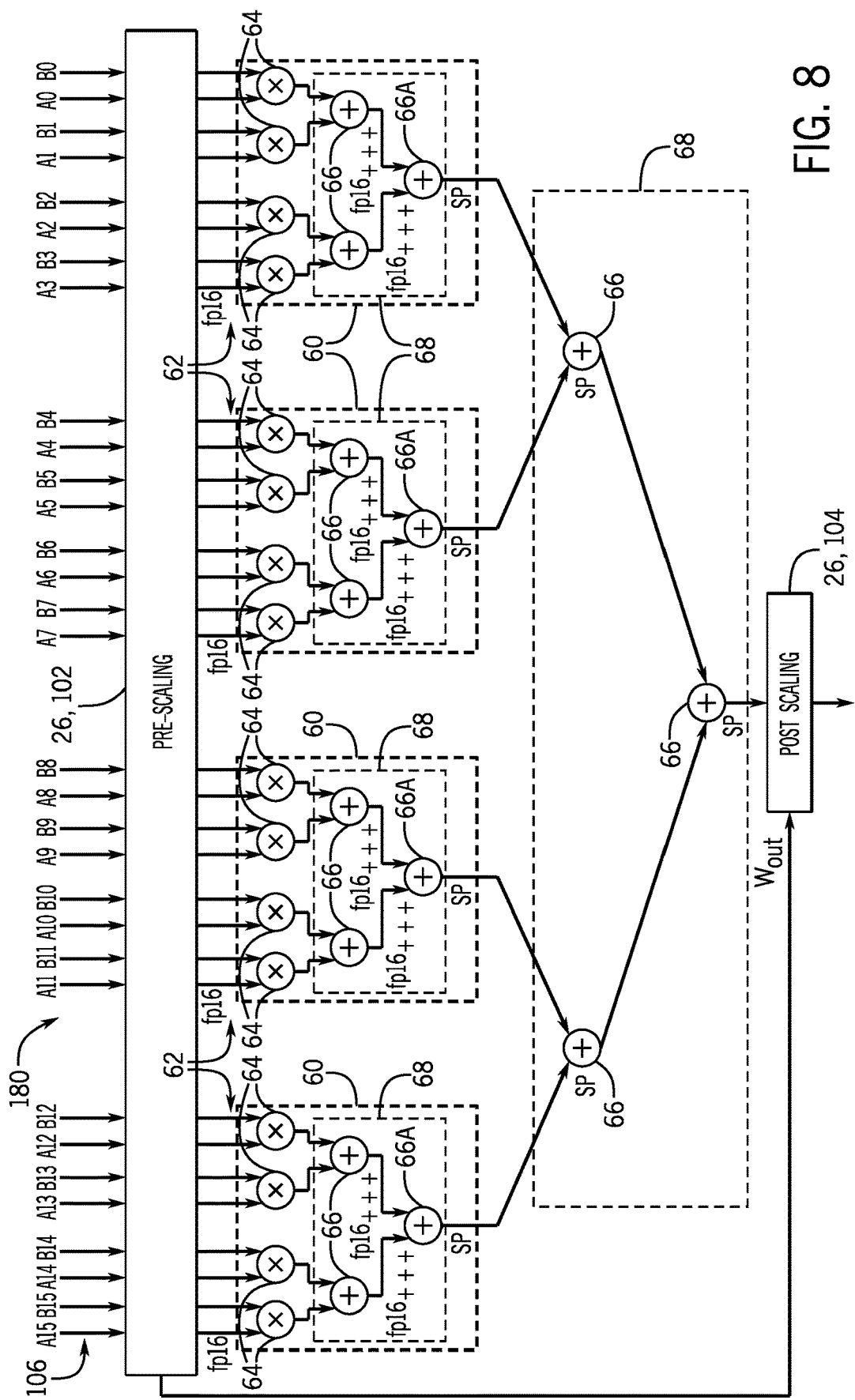
FIG. 8 is a block diagram of extended arithmetic operation emulation circuitry, in accordance with an embodiment.

Turning now to FIG. 8, while the DSP circuitry 60 described herein is implemented with four multipliers 64 (e.g., implemented to receive up to eight independent inputs), the techniques described herein may be applied to larger multiplier structures (e.g., dot-product structures), such as the extended arithmetic operation emulation circuitry 180. Accordingly, in some embodiments, the pre-scaling circuitry 102 may include additional input circuitry 106. Further, because the pre-scaling circuitry 102 may determine the maximum value of the sums (M) of pairs of exponents based on each of the inputs to the pre-scaling circuitry 102, the sums of pairs of exponents corresponding to the additional input circuitry 106 may be used to determine the maximum value of the sums (M). For example, in the illustrated embodiment of FIG. 8, the pre-scaling circuitry 102 is implemented to receive thirty-two inputs (e.g., two vectors (A and B) of sixteen inputs). As such, the pre-scaling circuitry 102 may determine the maximum value (M) of sixteen sums of pairs of exponents. As described above, the pre-scaling circuitry 102 may then scale each of the thirty-two inputs using at least an offset value (W) determined using the maximum value (M).

As further illustrated, the scaled inputs may be routed in groups to a suitable number of DSP circuitries 60. For example, the scaled inputs may be routed in groups of eight to DSP circuitries 60 with a set of four multipliers. Additionally or alternatively, the DSP circuitries 60 may be implemented with a greater or fewer number of multipliers 64, which may alter the number of groups and/or the number of inputs included in each group routed to the DSP circuitries 60. Each DSP circuitry 60 may then determine a portion of the final dot-product. For example, a DSP circuitry 60 may determine a first product of a first pair of inputs, may determine a second product of a second pair of inputs, and may output a sum of the first product and the second product.

To generate the final result of the dot-product of the inputs, the output of each of the DSP circuitries 60 may be summed. Accordingly, in some embodiments, the extended arithmetic operation emulation circuitry 180 may include one or more adders 66, which may be structured in an adder tree 68, implemented to sum the outputs of the DSP circuitries 60. Further, because each of the DSP circuitries 60 may produce a single-precision floating-point output, the adders 66 may be implemented to add single-precision floating-point inputs and produce a single-precision floating-point sum. Accordingly, a final dot-product resulting from the sum of each of the output of the DSP circuitries 60 may be formatted as a single-precision floating-point number.

To that end, the extended arithmetic operation emulation circuitry 180 may include the post-scaling circuitry 104 to scale the final dot-product. As illustrated, for example, the final dot-product may be scaled from single-precision floating-point format to bfloat16. To do so, the extended multiplier structure may route a result offset value (Wout) to the post-scaling circuitry 104. As described above, the post-scaling circuitry 104 may use the result offset value (Wout) to scale the exponent of the final dot-product back to the original range of the inputs to the pre-scaling circuitry 102. To determine the result offset value (Wout) the maximum sum value (M) determined at the pre-scaling circuitry 102 may be routed to a subtractor 108. The subtractor may subtract an integer (e.g., '284') determined based on the first format (e.g., bfloat16), the second format (e.g., half-precision floating-point), an internal number format of the DSP circuitries 60 (e.g., FP16+++), or a combination thereof, from the maximum sum value (M) to generate the result offset value (Wout).

While the illustrated embodiment of the extended arithmetic operation emulation circuitry 180 is implemented to receive bfloat16 inputs, the extended arithmetic operation emulation circuitry 180 may be implemented to receive any suitable number format, such as half-precision floating-point, single-precision floating-point, and/or an extended precision format. Further, as described above, the DSP circuitry 60 may be implemented to receive any suitable format. Accordingly, the pre-scaling circuitry 102 of the extended multiplier structure may be implemented to adjust the format of a received input to the format suitable for the DSP circuitry 60, such as half-precision floating-point, single-precision floating point, and/or the like. Further, the post-scaling circuitry 104 may be implemented to adjust the final dot-product to any format corresponding to the format of the inputs received by the pre-scaling circuitry 102. Thus, the embodiments described herein are intended to be illustrative and not limiting.

Moreover, in some embodiments, the techniques described herein may be implemented recursively. For example, in some embodiments, the adder tree 68 of the extended arithmetic operation emulation circuitry 180 may be replaced by one or more hierarchical levels of additional arithmetic operation emulation circuitry 100 and/or additional extended arithmetic operation emulation circuitry 180. Accordingly, instead of summing the outputs of the DSP circuitry 60 of the extended arithmetic operation emulation circuitry 180, the outputs may be scaled and routed to additional arithmetic operation emulation circuitry 100. More specifically, the post-scaling circuitry 104 of the extended arithmetic operation emulation circuitry 180 may adjust the each of the outputs of the illustrated DSP circuitries 60 to the original range and/or number format (e.g., bfloat16) of the inputs to the extended arithmetic operation emulation circuitry 180, and the scaled outputs may be routed to the additional arithmetic operation emulation circuitry 100. The additional arithmetic operation emulation circuitry 100 may, as described with reference to FIG. 5, include pre-scaling circuitry 102 suitable to scale each of the scaled outputs to a number format (e.g., half-precision floating-point) suitable for DSP circuitry 60 of the additional arithmetic operation emulation circuitry 100. The number format suitable for DSP circuitry 60 of the additional arithmetic operation emulation circuitry 100 may be the same or different compared to the number format suitable for the DSP circuitry 60 of the extended arithmetic operation emulation circuitry 180.

The DSP circuitry 60 may then perform one or more arithmetic operations on the scaled outputs. The one or more arithmetic operations may be the same or different compared to the one or more arithmetic operations performed by the DSP circuitry 60 of the extended arithmetic operation emulation circuitry 180. For example, the DSP circuitry 60 may compute a dot-product and/or an additional MAC operation. Moreover, the DSP circuitry 60 described herein includes eight independent inputs. Accordingly, half the inputs of the DSP circuitry 60 may be employed to perform arithmetic operations on the inputs to the additional arithmetic operation emulation circuitry 100. Alternatively, an embodiment of the DSP circuitry 60 implemented with four independent inputs (e.g., input circuitry 62) may be included in the additional arithmetic operation emulation circuitry 100.

The additional arithmetic operation emulation circuitry 100 may, using post-scaling circuitry 104, scale the output of the DSP circuitry 60 back to the original format (e.g., bfloat16) received at the pre-scaling circuitry 102 of the additional arithmetic operation emulation circuitry 100. In some embodiments, the scaled output of the additional arithmetic operation emulation circuitry 100 may represent the final result of a series of one or more recursive arithmetic operations performed at one or more arithmetic operation emulation circuitries 100 and/or extended arithmetic operation emulation circuitry 180. Alternatively, the scaled output of the additional arithmetic operation emulation circuitry may then feed into another arithmetic operation circuitry 100.

Further, in some embodiments, instead scaling the outputs of the DSP circuitries 60 of the extended arithmetic operation emulation circuitry 180 to the original format of the inputs to the extended arithmetic operation emulation circuitry 180 (e.g., bfloat16) prior to routing the outputs to the additional arithmetic operation emulation circuitry 100, the outputs may be routed directly to the additional arithmetic operation emulation circuitry 100. In such cases, the additional arithmetic operation emulation circuitry 100 may then scale the outputs from, for example, single-precision floating-point format to a format (e.g., half-precision floating-point) suitable for the DSP circuitry 60 of the additional arithmetic operation emulation circuitry 100. Further, the output of the DSP circuitry 60 may be scaled by the post-scaling circuitry 104 of the additional arithmetic operation emulation circuitry 100 back to the format (e.g., single-precision floating-point) output by the DSP circuitries 60 of the extended arithmetic operation emulation circuitry 180. Accordingly, the post-scaling circuitry 104 of the extended arithmetic operation emulation circuitry 180 may scale the output of the additional arithmetic operation emulation circuitry 100 to the format of the inputs to the extended arithmetic operation emulation circuitry 180 (e.g., from single-precision floating-point format to bfloat16).

Figure 9:
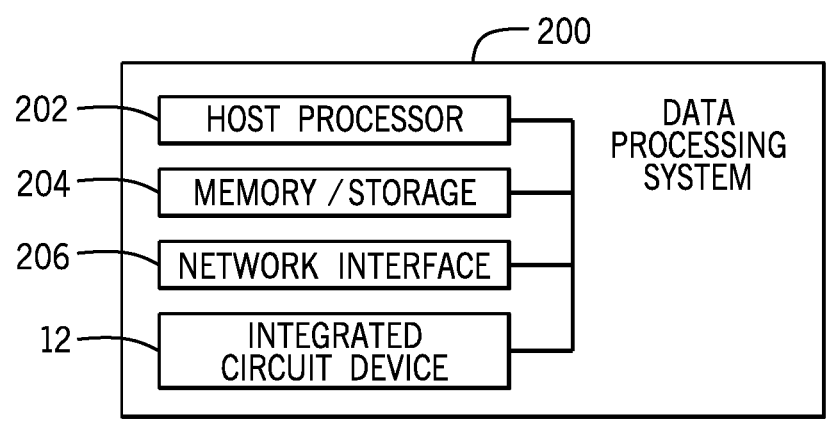
FIG. 9 is block diagram of a data processing system, in accordance with an embodiment.

Further, the integrated circuit device 12 may be, or may be a component of, a data processing system. For example, the integrated circuit device 12 may be a component of a data processing system 200, shown in FIG. 9. The data processing system 200 may include a host processor 202, memory and/or storage circuitry 204, and a network interface 206. The data processing system 200 may include more or fewer components (e.g., electronic display, user interface structures, application specific integrated circuits (ASICs)). The host processor 202 may include any suitable processor, such as an INTEL® Xeon® processor or a reduced-instruction processor (e.g., a reduced instruction set computer (RISC), an Advanced RISC Machine (ARM) processor) that may manage a data processing request for the data processing system 200 (e.g., to perform encryption, decryption, machine learning, video processing, voice recognition, image recognition, data compression, database search ranking, bioinformatics, network security pattern identification, spatial navigation, or the like). The memory and/or storage circuitry 204 may include random access memory (RAM), read-only memory (ROM), one or more hard drives, flash memory, or the like. The memory and/or storage circuitry 204 may hold data to be processed by the data processing system 200. In some cases, the memory and/or storage circuitry 204 may also store configuration programs (bitstreams) for programming the integrated circuit device 12. The network interface 206 may allow the data processing system 200 to communicate with other electronic devices. The data processing system 200 may include several different packages or may be contained within a single package on a single package substrate.

In one example, the data processing system 200 may be part of a data center that processes a variety of different requests. For instance, the data processing system 200 may receive a data processing request via the network interface 206 to perform encryption, decryption, machine learning, video processing, voice recognition, image recognition, data compression, database search ranking, bioinformatics, network security pattern identification, spatial navigation, or some other specialized task. The host processor 202 may cause the programmable logic fabric of the integrated circuit device 12 to be programmed with an adder suitable to implement a requested task. For instance, the host processor 202 may instruct that a configuration data (bitstream) stored on the memory and/or storage circuitry 204 to be programmed into the programmable logic fabric of the integrated circuit device 12. The configuration data (bitstream) may represent a circuit design for scaling circuitry 26, which may be mapped to the programmable logic according to the techniques described herein, to adjust the number representation of an input to and/or an output from hard logic, such as DSP circuitry 60. By adjusting the number representation of an input, arithmetic operations performed in a first format may be emulated by a scaled result of arithmetic operations performed in a second format. As such, the integrated circuit device 12 may assist the data processing system 200 in performing the requested task even when the integrated circuit device 12 lacks hardware support for the number format of one or more variables (e.g., inputs) involved in the processing of the requested task.

While the embodiments set forth in the present disclosure may be susceptible to various modifications and alternative forms, specific embodiments have been shown by way of example in the drawings and have been described in detail herein. For example, any suitable combination of the embodiments and/or techniques described herein may be implemented. Accordingly, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An integrated circuit device, comprising:
    first combinatorial circuitry, wherein the first combinatorial circuitry comprises first input circuitry configured to receive a first set of inputs having a first range, and wherein the first combinatorial circuitry is configured to scale a respective exponent of each of the first set of inputs from the first range to a second range to produce a first set of scaled inputs, wherein the second range is less than the first range;
    first arithmetic circuitry configured to perform one or more arithmetic operations on the first set of scaled inputs and to produce an output having a third range, wherein the first arithmetic circuitry comprises second input circuitry communicatively coupled to the first combinatorial circuitry; and
    second combinatorial circuitry communicatively coupled to the first arithmetic circuitry and configured to produce a scaled output by scaling the output from the third range to the first range.

2. The integrated circuit device of claim 1, wherein scaling the respective exponent of each of the first set of inputs comprises:
    determining a first set of exponent sums, wherein determining the first set of exponent sums comprises summing, for each pair of inputs of the first set of inputs, a first exponent of a respective first input of the respective pair and a second exponent of a respective second input of the respective pair; and
    scaling the respective exponent of each of the first set of inputs from the first range to the second range based at least in part on a maximum exponent sum of the first set of exponent sums.

3. The integrated circuit device of claim 2, wherein the first arithmetic circuitry comprises a multiplier, and wherein the respective first input of the respective pair corresponds to a first input to the multiplier and the respective second input of the respective pair of inputs corresponds to a second input to the multiplier.

4. The integrated circuit device of claim 1, wherein the one or more arithmetic operations comprises a dot-product.

5. The integrated circuit device of claim 1, wherein a number format of each of the first set of inputs comprises bfloat16.

6. The integrated circuit device of claim 1, comprising:
    third combinatorial circuitry, wherein the third combinatorial circuitry comprises third input circuitry configured to receive a second set of inputs having the first range, wherein the second set of inputs comprises the scaled output, and, wherein the third combinatorial circuitry is configured to scale a respective exponent of each of the second set of inputs from the first range to the second range to produce a second set of scaled inputs;
    second arithmetic circuitry configured to perform one or more additional arithmetic operations on the second set of scaled inputs and to produce an additional output having the third range, wherein the second arithmetic circuitry comprises fourth input circuitry communicatively coupled to the third combinatorial circuitry; and
    fourth combinatorial circuitry communicatively coupled to the second arithmetic circuitry and configured to scale the additional output from the third range to the first range.

7. The integrated circuit device of claim 1, comprising:
    third combinatorial circuitry, wherein the third combinatorial circuitry comprises third input circuitry configured to receive a second set of inputs having a fourth range and is configured to scale a respective exponent of each of the second set of inputs from the fourth range to a fifth range to produce a second set of scaled inputs;
    second arithmetic circuitry configured to perform one or more arithmetic operations on the second set of scaled inputs and to produce an additional output having the first range, wherein the first input circuitry is communicatively coupled to the second arithmetic circuitry, wherein the first set of inputs comprises the additional output; and
    second combinatorial circuitry communicatively coupled to the second arithmetic circuitry and configured to produce an additional scaled output by scaling the scaled output from the first range to the fourth range.

8. The integrated circuit device of claim 1, wherein the first arithmetic circuitry comprises a multiplier configured to perform at least one of the one or more arithmetic operations.

9. The integrated circuit device of claim 1, wherein the first arithmetic circuitry comprises hard logic.

10. The integrated circuit device of claim 1, wherein the integrated circuit device comprises a field-programmable gate array.

11. A hardware implemented method, comprising:
receiving, at first input circuitry, a set of inputs having a first number format, wherein the first number format comprises a first range;
scaling, using pre-scaling circuitry, each of the set of inputs from the first number format to a second number format different from the first number format to produce a set of scaled inputs, wherein the second number format comprises a second range lower than the first range;
receiving, using hardened arithmetic circuitry, the scaled set of inputs according to the second number format;
performing, using the hardened arithmetic circuitry, one or more arithmetic operations on the scaled set of inputs to produce an output having a third number format, wherein the third number format comprises a third range; and
scaling, using post-scaling circuitry, the output from the third number format to the first number format.

12. The hardware implemented method of claim 11, wherein an exponent of a first input of the set of scaled inputs and an exponent of a second scaled input of the set of scaled inputs are balanced.

13. The hardware implemented method of claim 11, wherein scaling each of the set of inputs comprises:
determining a set of exponent sums, wherein determining the set of exponent sums comprises summing, for each pair of inputs of the set of inputs, a first exponent of a respective first input of a respective pair and a second exponent of a respective second input of the respective pair;
determining a maximum exponent sum of the set of exponent sums; and
scaling a respective exponent each of the set of inputs from the first range to the second range based at least in part on the maximum exponent sum of the set of exponent sums.

14. The hardware implemented method of claim 13, wherein scaling the respective exponent of the first set of inputs based at least in part on the maximum exponent sum of the set of exponent sums comprises:
determining an offset value based at least in part on the maximum exponent sum of the set of exponent sums and a maximum biased exponent value of the second number format;
subtracting the offset value from each of the set of exponent sums to produce a set of adjusted exponent sums; and
determining a respective scaled exponent for each of the set of inputs based at least in part on a corresponding adjusted exponent sum of the set of adjusted exponent sums.

15. The hardware implemented method of claim 14, wherein determining the respective scaled exponent for the respective first input of the respective pair comprises:
shifting the adjusted exponent sum right by one or more bits; and
wherein determining the respective scaled exponent for the respective second input of the respective pair of inputs comprises:
shifting the adjusted exponent sum right by one or more bits; and
when the adjusted exponent sum is odd:
summing the shifted adjusted exponent sum with a least significant bit of the adjusted exponent sum.

16. The hardware implemented method of claim 13, wherein scaling the output from the third number format to the first number format comprises:
determining an offset value based at least in part on the maximum exponent sum of the set of exponent sums and a maximum biased exponent value of the first number format; and
summing the offset value with an exponent of the output.

17. The hardware implemented method of claim 11, wherein scaling each of the set of inputs comprises scaling a respective exponent of each of the set of inputs from a first number of bits to a second number of bits.

18. The hardware implemented method of claim 11, wherein scaling each of the set of inputs from the first number format to the second number format comprises one of truncating one or more bits from a respective mantissa of each of the set of inputs or zero padding one or more bits to the respective mantissa of the set of inputs.

19. A tangible, non-transitory, machine-readable medium, comprising machine-readable instructions to construct adder circuitry that, when executed by one or more processors, cause the one or more processors to:
configure first combinatorial circuitry comprising first input circuitry to:
receive a set of inputs having a first range;
scale a respective exponent of each of the set of inputs from the first range to a second range to produce a set of scaled inputs, wherein the second range is lower than the first range; and
route the set of scaled inputs to first digital signal processing (DSP) circuitry configured to perform one or more arithmetic operations on the set of scaled inputs and to produce an output having a third range, wherein the first DSP circuitry comprises second input circuitry communicatively coupled to the first combinatorial circuitry; and
configure second combinatorial circuitry communicatively coupled to the DSP circuitry to produce a scaled output by scaling the output from the third range to the first range.

20. The tangible, non-transitory, machine-readable medium of claim 19, wherein configuring the second combinatorial circuitry to produce the scaled output by scaling the output from the third range to the first range comprises:
configuring the second combinatorial circuitry to, when a value of an exponent of the output is non-zero:
sum an offset value with the exponent of the output; and
configuring the second combinatorial circuitry to, when the value of the exponent of the output is zero:
maintain the value of the exponent at zero.

* * * * *